United States Patent [19]

Pearlman

[11] Patent Number: 4,790,740
[45] Date of Patent: Dec. 13, 1988

[54] APPARATUS FOR PREPARING A DECORATIVE COOKED EGG

[76] Inventor: Melinda F. Pearlman, 46 Lakeview Rd., Asheville, N.C. 28804

[21] Appl. No.: 874,291

[22] Filed: Jun. 13, 1986

Related U.S. Application Data

[62] Division of Ser. No. 696,106, Jan. 29, 1985, abandoned.

[51] Int. Cl.⁴ .............................................. B29C 53/22
[52] U.S. Cl. ..................................... 425/396; 249/156; 249/164; 425/441; 425/451.9; 426/144; 426/512
[58] Field of Search ............... 425/412, 396, 293, 398, 425/451.9, 442, 441; 264/168, 325, 337, 239, 293; 426/274, 512, 614, 144, 104; 249/55, 104, 156, 164, 141; D7/7, 84.1, 359

[56] References Cited

U.S. PATENT DOCUMENTS

| | | | |
|---|---|---|---|
| D. 54,367 | 2/1920 | Bierbach | D7/7 |
| 534,633 | 2/1895 | Coleman | 249/127 |
| 699,623 | 6/1902 | Kempshall | 264/325 |
| 1,782,088 | 11/1930 | Balton | 425/412 |
| 1,881,088 | 10/1931 | Matuschka | 249/156 |
| 2,803,202 | 7/1957 | Schafer | 426/512 |
| 3,008,235 | 11/1961 | Royer et al. | 426/512 |
| 3,161,156 | 12/1964 | Batista et al. | 249/141 |
| 3,380,121 | 7/1965 | Chittenden et al. | 249/104 |
| 3,410,699 | 11/1968 | Peters | 426/512 |
| 3,483,908 | 12/1969 | Donovan | 249/127 |
| 3,533,593 | 8/1967 | Beck et al. | 249/104 |
| 3,680,828 | 8/1972 | Swett | 249/104 |
| 3,756,553 | 9/1973 | Ranz | 249/156 |
| 3,940,232 | 2/1976 | Stock | 249/120 |
| 3,961,089 | 6/1976 | Dogliotti | 426/274 |
| 4,092,093 | 5/1978 | Nakagawa | 425/398 |
| 4,120,635 | 10/1978 | Langecker | 425/451.9 |
| 4,171,791 | 10/1979 | Britz | 249/156 |
| 4,544,561 | 10/1985 | Komukai | 426/104 |

Primary Examiner—Jay H. Woo
Assistant Examiner—C. Scott Bushey
Attorney, Agent, or Firm—Kenyon & Kenyon

[57] ABSTRACT

A decorative hard boiled egg having a corrugated external surface is produced by placing a shelled boiled egg in a mold. The mold is provided with transverse circular corrugations or with longitudinal corrugations, the corrugations preferably taking the form of inwardly extending ridges alternating with inwardly concave surfaces. The egg mold may comprise a container and a plurality of molding elements interchangable with other molding elements to vary the aspect of the molded egg.

12 Claims, 2 Drawing Sheets

APPARATUS FOR PREPARING A DECORATIVE COOKED EGG

This is a division of application Ser. No. 696,106 filed Jan. 29, 1985, now abandoned.

BACKGROUND OF THE INVENTION

This invention relates to a method and apparatus for preparing a cooked egg, exemplarily a hard boiled egg, having a decorative aspect.

Shelled cooked eggs particularly hard boiled eggs, are frequently placed, either as whole eggs or in a sliced form, on salad platters or served as garnish with other dishes.

An object of the present invention is to provide a method of preparing a cooked egg having a pleasingly decorative aspect in its sliced and unsliced forms.

Another, more particular, object of the present invention is to provide such a method which is easily implemented and which does not necessarily lead to a waste of any edible egg substance.

Another particular object of the present invention is to provide such a method which utilizes commonly available articles as tools.

Yet another object of the present invention is to provide an apparatus for preparing a cooked egg having a decorative aspect.

SUMMARY OF THE INVENTION

A method of preparing a cooked egg having a decorative aspect comprises, in accordance with the present invention, the steps of (a) applying sufficient energy to an egg in its shell to cook the edible material of the egg, (b) removing the shell from the cooked egg, (c) placing the shelled cooked egg into a mold having a corrugated molding surface, and (d) removing the egg from the mold after a time sufficient for the egg to assume a corrugated form.

Advantageously, the egg is hard boiled and remains in the mold for a time period of at least 45 minutes, and preferably approximately 1 hour.

In accordance with one of two alternative features of the present invention, the mold has a longitudinal axis and circular corrugations lying in respective transverse planes oriented substantially perpendicularly to the axis. This mold produces a corrugated egg formed with circular corrugations lying in respective transverse planes oriented substantially perpendicularly to the longitudinal axis of the egg. The transversely corrugated egg may be subjected to a slicing operation in which the egg is cut along a plurality of parallel longitudinal planes extending substantially perpendicularly with respect to the transverse planes of the corrugations of the egg.

In accordance with the other of the two alternative features of the present invention, the mold has a longitudinal axis and a plurality of corrugations lying in respective longitudinal planes each containing the axis, the planes being angularly staggered with respect to each other. This mold produces a corrugated egg formed with a plurality of corrugations lying in respective longitudinal planes each containing the longitudinal axis of the egg. The longitudinal corrugations of the egg are angularly staggered with respect to each other. The longitudinally corrugated egg may be sliced along a plurality of parallel transverse planes all extending substantially perpendicularly with respect to the longitudinal axis of the egg.

An egg slice produced pursuant to the first of the above-described two alternative features of the present invention is generally oval and has a generally wave shaped perimetral edge which is preferably scalloped. An egg sliced produced in accordance with the second alternative feature is generally circular and has a generally wave-shaped perimetral edge which is also preferably scalloped.

In accordance with the present invention, a mold for making an egg having a corrugated form comprises a first mold portion and a second mold portion engageable with the first mold portion to form a substantially ovoid mold cavity sufficiently large to contain an shelled cooked egg of a preselected size in a substantially tight fit. At least one of the mold portions is provided with shaping means in the form of a plurality of corrugations for molding the egg into a corrugated form upon the disposition of the egg in the mold cavity.

The mold advantageously also comprises a clamp engageable with the first and second mold portions for holding the same in engagement with one another upon disposition of the egg in the mold cavity. As an alternative to the clamp, the mold portions may constitute upper and lower mold portions, the upper mold portion being of a sufficient weight to exert a compressive molding force on the egg upon disposition thereof in the mold cavity.

In accordance with another feature of the present invention, the corrugations of the mold may be formed by a plurality of separate elements engageable with one another to form a continuous generally ovoid surface defining the mold cavity. The elements may take the shape of rings having different diameters and stackable upon one another to form the corrugations of the shaping means.

An egg having a corrugated outer surface, or an egg slice having a wave-shape or scalloped perimetral edge, as produced in accordance with the present invention, is aesthetically as well as gustatorily pleasing. The egg slices, in particular, may each take a generally circular, ellipsoidal or oval form, while the wave shapes at the perimeter of the egg slice may be formed in any of a number of combinations. Each corrugation may be convex or concave, sharp or gradual, of a large extent or a small extent. The mixing of different wave shaped to form the corrugations of the egg is facilitated by the feature of the invention wherein the corrugations of the mold comprise a plurality of separate elements engageable with one another. The elements may be mixed and matched to form different combinations of corrugations.

DETAILED DESCRIPTION

In accordance with the present invention, approximately two tablespoons of vinegar (for reducing the chance of egg breakage) is added to a pot of water which is brought to a boil. An egg is boiled in a pot of water for sufficient amount of time to completely cook the edible matter of the egg. Upon the completion of the cooking process, the shell of the egg is removed. The shelled egg may then be allowed to stand for a short time, for example, a half hour. This, however, is not necessary.

Figure 1:
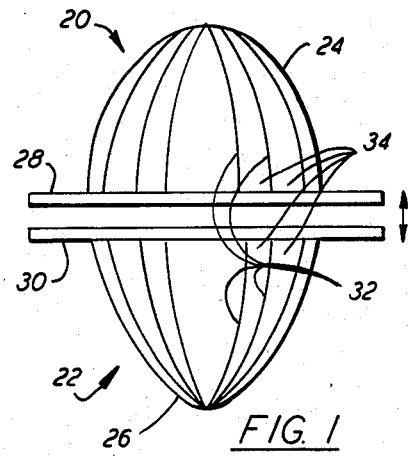
FIG. 1 is a front elevational view of a pair of identical mold halves used in a method in accordance with the present invention.

The shelled cooked egg is then placed in a mold for at least 45 minutes and preferably approximately 1 hour. The mold may comprise a pair of identical mold halves 20 and 22, as illustrated in FIG. 1, each mold half consisting of a ridged form such as that used for squeezing the juice out of a piece of citrus fruit. Each mold half comprises a mold body 24 and 26 attached to a generally plate-shaped base 28 and 30. Each mold body 24 and 26 is provided both on an outer surface and an inner surface with a multiplicity of angularly equispaced longitudinal corrugations and, more particularly, inwardly extending ridges or crests 32 and outwardly convex, gently curving surfaces 34. Alternatively, in conformity with the shapes of some pressure forms for squeezing the juice from citric fruit halves, the ridges may be outwardly extending, while the gently curving surfaces are inwardly convex.

Figure 2:
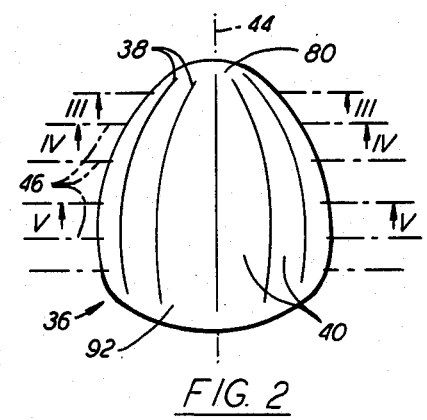
FIG. 2 is a front elevational view of a cooked egg having a decorative aspect, produced by a method in accordance with the present invention.

Upon the disposition of the shelled hard-boiled egg in one of the mold halves 20 and 22 and the placement of the other mold half into engagement with the half containing the hard-boiled egg, the egg is subjected to molding compressive forces for at least 45 minutes to 1 hour. Upon removal of the molded shelled hard-boiled egg 36 from the mold halves 20 and 22, the egg has a generally corrugated form provided with a multiplicity of longitudinal V-shaped grooves 38 alternating around the circumference of the egg with outwardly convex longitudinally extending surfaces 40, as shown in FIG. 2.

Figure 3:
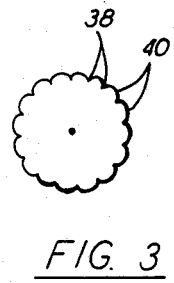
FIG. 3 is a cross-sectional view taken along line III—III in FIG. 2.
Figure 4:
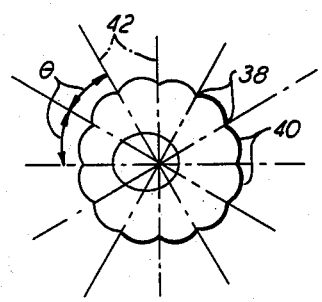
FIG. 4 is a cross-sectional view taken along line IV—IV in FIG. 2.
Figure 5:
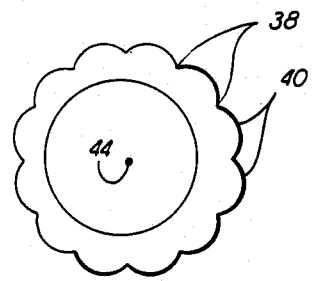
FIG. 5 is a cross-sectional view taken along line V—V in FIG. 2.

As best seen in the cross-sectional views of egg 36 shown in FIGS. 3-5, the corrugations, i.e., grooves 38 and surfaces 40, in the external surface of egg 36 are disposed in respective longitudinal planes 42 angularly staggered with respect to one another and intersecting one another along the longitudinal axis 44 of egg 36. An angle θ between any two adjacent planes 42 is preferably equal to the angle between any other two adjacent planes so that grooves 38 are equispaced about the circumference of egg 36 in any cross-sectional view thereof.

Figure 6:
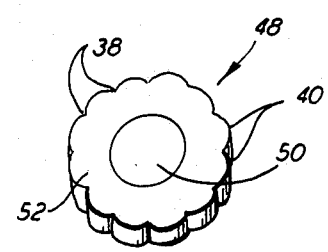
FIG. 6 is a perspective of an egg slice formed by cutting the egg of FIG. 2 along two parallel transverse planes.

Upon the molding of hard-boiled egg 36, the egg may be sliced along a plurality of parallel transverse planes 46 (see FIG. 2) all oriented substantially perpendicularly with respect to longitudinal planes 42 (FIG. 4) and longitudinal axis 44 of egg 36. Planes 46 are preferably, but not necessarily, equispaced from each other. The slicing of egg 36 along planes 46 produces a plurality of egg slices such as slice 48 illustrated in FIG. 6. Egg slice 48 comprises a generally centrally located yellow or orange circular yolk portion 50 and a circumferential white portion 52. White portion 52 is formed about a perimetral edge with equispaced grooves 38 and convex bulges 40, whereby the perimetral edge assumes a scalloped wave shape.

After the egg has been boiled, it is preferably immersed immediately in cold water and subsequently shelled at any point prior to the commencement of the molding process. After boiling, the egg may remain at room temperature or be refrigerated for as long as at least 24 hours and still be suitable for molding. However, the egg can be placed in the mold immediately to begin the molding process. Upon molding, the egg retains its molded shape for a substantially indefinite period of time.

Figure 7:
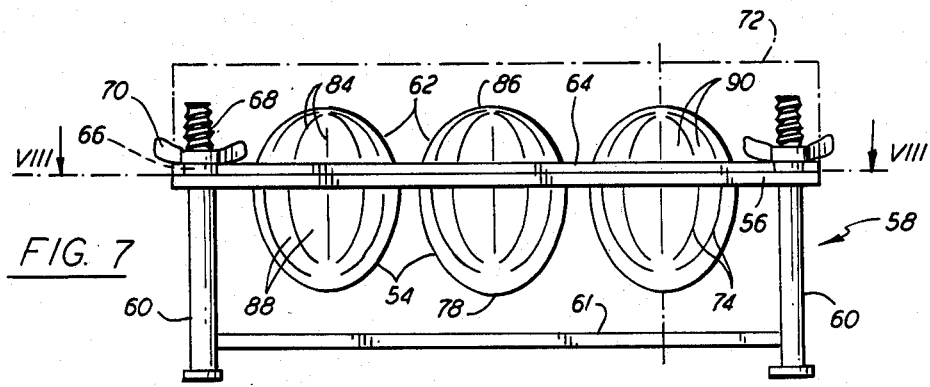
FIG. 7 is a front elevational view of an egg mold in accordance with the invention.
Figure 8:
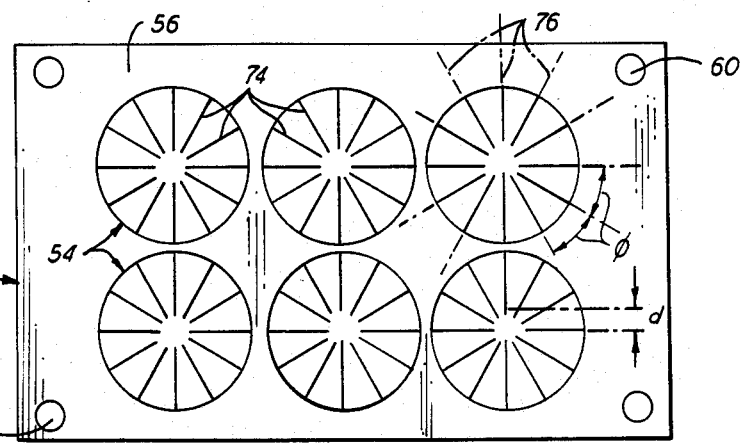
FIG. 8 is a top view of a lower mold portion, taken along line VIII—VIII in FIG. 7.

As illustrated in FIGS. 7 and 8, a mold for use in forming a decorative egg in accordance with the present invention may comprise a multiplicity of lower mold portions 54 secured to a mounting plate 56 of a frame 58. Mounting plate 56 is rigid with a plurality of support members such as legs or posts 60 which may be further connected to each other by one or more bracing or bracket members 61. The multiple egg mold of FIGS. 7 and 8 further comprises a multiplicity of upper mold portions 62 attached to an upper mounting plate 64. Upper mounting plate 64 is provided with a plurality of apertures 66 traversable by threaded upper extensions 68 of support posts 60. Upper mold portions 62 are disposed on mounting plate 64 in an array identical to the pattern in which lower mold portions 54 are attached to lower mounting plate 56 so that upon placement of upper mounting plate 64 into engagement with lower mounting plate 56, upper mold portions 62 are aligned with respective lower mold portions 54. Upper mounting plate 64 may be clamped to lower mounting plate 56 by means of a plurality of wing nuts 70 screwable over the threaded extensions 68 of posts 60. Advantageously, the mold is further provided with one or more spring washers, accordion springs or other resilient members (not illustrated) insertable between mounting plates 56 and 64 for ensuring the accommodation of eggs of different sizes in mold cavities formed by upper mold portions 62 and lower mold portions 54.

The clamping of upper mold portions 62 to lower mold portions 54 may be accomplished in several different ways other than through the use of threaded post portions 68 and wing nuts 70. For example, mold portions 62 may be formed as respective recesses in a solid mold block 72 formed of a dense material such as metal. In such a case, the weight of the mold block may be sufficient to exert a compressive molding force on eggs disposed within the mold cavities.

As illustrated in FIG. 8, each lower mold portion 54 is provided with a multiplicity of inwardly extending longitudinal ridges 74. The ridges are disposed in respective longitudinal planes 76 angularly staggered with respect to one another at a common angle θ.

Ridges 54 extend from mounting plate 56 towards a lower end 78 of the respective lower mold portion 54 and terminate at a distance d from the end 78 of the mold portion 54, whereby the molded egg 36 (see FIG. 2) includes an end portion 80 which retains the original egg shape.

Each lower mold portion 54 has a longitudinal axis of symmetry 82 which is identical to the axis of symmetry of the mold cavity formed by the lower mold portion and the upper mold portion 62 associated therewith. The axis of symmetry 82 is coplanar with the ridges 74 of lower mold portions 54, i.e., is contained within each longitudinal plane 76.

Each upper mold portion 62 is similarly formed with a multiplicity of inwardly extending, angularly equispaced longitudinal ridges 84 which terminate short of the upper end 86 of the respective mold portion 62. On external surfaces of the mold portions 54 and 62, ridges 74 and 84 take the form of V-shaped grooves. Between the grooves or ridges 74 of lower mold portions 54, the outer surfaces 88 of the lower mold portions 54 are convexly curved, while the corresponding inner surfaces are concave. Similarly, the outer surfaces 90 of upper mold portions 62 between grooves or ridges 84 are convex, while the corresponding inner surfaces are concave.

The mold illustrated in FIGS. 7 and 8 is utilized for simultaneously molding a multiplicity of decorative eggs. There may be any number of mold cavities to accommodate any number of eggs and thus facilitate the production in a short period of time of large numbers of molded eggs in accordance with the invention.

The termination of ridges or grooves 84 short of the upper ends 86 of upper mold portions 62 produce an egg which has a large end 92 (see FIG. 2) which retains its original shape, i.e., is not corrugated.

Figure 9:
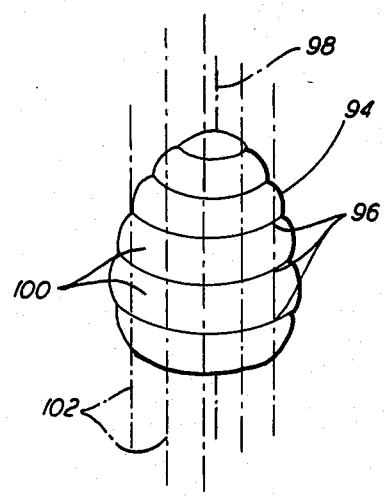
FIG. 9 is a front elevational view of an egg having another decorative aspect, in accordance with the present invention.
Figure 10:
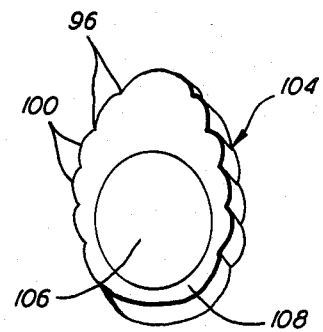
FIG. 10 is a perspective view of an egg slice formed by cutting the egg of FIG. 9 along a pair of parallel longitudinal planes.

In accordance with the present invention, the corrugations of a molded egg may extend in a transverse direction, as illustrated in FIGS. 9 and 10, rather than in a longitudinal direction, as shown in FIGS. 2–6. Pursuant to the embodiment of FIGS. 9 and 10, an egg 94 has a multiplicity of cross-sectionally V-shaped circular grooves 96 preferably equispaced from one another along a longitudinal axis 98 of egg 92. Between grooves 96 egg 94 is formed with a multiplicity of outwardly convex annular surfaces 100.

Egg 94 may be sliced along a multiplicity of longitudinal planes 102 parallel to one another and to axis 98. The slicing along planes 102 produces a plurality of egg slices such as slice 104 shown in FIG. 10. Slice 104 has a generally circular yellow or orange yolk portion 106 and an outer white portion 108. The perimeter of white portion 108, provided with grooves 96 and convex surfaces 100, is generally wave-shaped and particularly scalloped.

Figure 11:
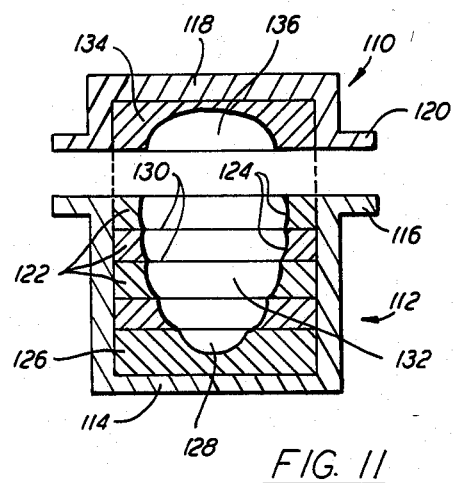
FIG. 11 is a longitudinal cross-sectional view of a pair of mold portions in accordance with the invention.

As illustrated in FIG. 11, decorative egg 94 may be formed by utilizing a mold having an upper mold portion 110 and a lower mold portion 112. Lower mold portion 112 includes a cylindrical mold container 114 closed at one end and open at an opposite end, container 114 being provided at its open end with an outwardly extending annular flange 116. Upper mold portion 110 similarly includes a cylindrical cap or lid 118 closed at one end and opened at an opposite end and provided in the region of its open end with an outwardly extending annular flange 120. Inserted in container 114 are a plurality of ring-shaped molding elements 122 each provided with a cross-sectionally arcuate, and particularly inwardly concave, surface 124. At the bottom of container 114 is disposed a lowermost molding element 126 in which is centrally disposed a generally hemispherically shaped recess 128. The surface defining recess 128 and surfaces 124 of ring-shaped molding elements 122 are matched to one another to form a multiplicity of inwardly extending circular ridges 130 at the boundaries between adjacent ones of molding elements 122 and 126.

Lowermost molding element 126 and ring-shaped molding elements 122 form a generally ovoid molding cavity 132. An shelled hard boiled egg is placed within cavity 132, whereupon an uppermost molding element 134 is placed upon the upper end of the egg protruding from mold cavity 132. Molding element 134 is provided with a generally ellipsoidal recess 136 which receives the upper end of the egg. Upon the placement of molding element 134 on the upper end of the egg, cap 118 is slid over molding element 134 so that flange 120 engages flange 116. Flanges 116 and 120 may be clipped together then by means of a plurality of resilient fasteners 138 (FIG. 12).

Ring-shaped molding elements 122 are removable from container 114. Each molding element 122 may be replaced by one or more annular molding elements 140, as illustrated in FIG. 12. Each annular molding element 140 has a cross-sectionally arcuate, preferably concave, inner surface 142. It is to be understood that molding surfaces 124 and 142 may assume shapes other than concave and that a variety of different combinations of ring-shaped molding elements are possible.

Figure 12:
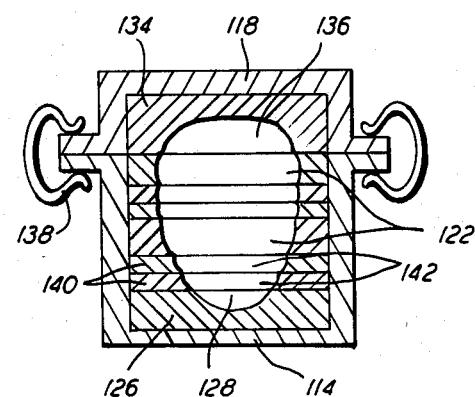
FIG. 12 is a longitudinal cross-sectional view of a pair of mold portions clamped to one another, in accordance with the present invention.
Figure 13:
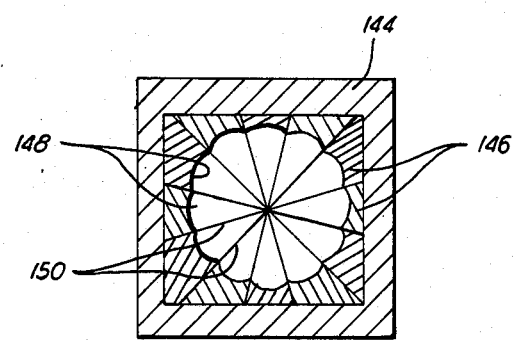
FIG. 13 is a transverse cross-sectional view of another mold in accordance with the invention.

FIG. 13 illustrates a rectangular mold container 144 similar to cylindrical container 114 in FIGS. 11 and 12. Disposed within container 144 is a multiplicity of mold elements 146 each having a cross-sectionally arcuate, preferably concave, inner surface 148, the different molding elements engaging one another along longitudinal planar surfaces to form a multiplicity of inwardly extending ridges 150. Ridges 150 lie in respective longitudinal planes angularly staggered with respect to one another. Molding elements (not illustrated) having inner surfaces of differing curvatures may be substituted for one or more of the elements 146 shown in FIG. 13 to create molded eggs with corrugated exteriors having different combinations of wave shapes.

Although the invention has been described in terms of particular embodiments and illustrations, one of ordinary skill in the art, in light of this teaching, can generate additional embodiments and modifications without exceeding the scope or departing from the spirit of the claimed invention. Accordingly, it is to be understood that the descriptions herein and the accompanying illustrations are proffered by way of example and should not be construed to limit the scope of the invention.

What is claimed is:

1. A mold for making an egg having a corrugated form, said mold comprising:
   a first mold half;
   a second mold half engageable with said first mold half to form a substantially ovoid mold cavity sufficiently large to contain a shelled cooked egg of a preselected size in a substantially tight fit, said first and said second mold half having a longitudinal axis of symmetry in an assembled state of the mold; and
   shaping means including a plurality of corrugations within said first and said second mold half for molding said egg into a corrugated form upon a disposition of said egg in said mold cavity, said corrugations being circular and disposed in respective transverse planes oriented substantially perpendicularly to said axis.

2. The mold defined in claim 1, further comprising clamping means engageable with said first and said second mold half for holding said first and said second mold half in engagement with one another upon disposition of said egg in said mold cavity.

3. The mold defined in claim 1 wherein one of said first and said second mold half constitutes a lower mold half and the other of said first and said second mold half constitutes an upper mold half, said upper mold half being of a sufficient weight to exert a compressive molding force on said egg upon disposition thereof in said mold cavity.

4. The mold defined in claim 1 wherein said shaping means includes a plurality of separate elements engageable with one another to form a continuous, generally ovoid surface defining said mold cavity.

5. The mold defined in claim 1 wherein said shaping means includes a plurality of ring shaped elements having different diameters and stackable upon one another to form said corrugations.

6. The mold defined in claim 1, comprising a plurality of lower mold portions and a like plurality of upper mold portions, said first mold half constituting one of said lower mold portions and said second mold half constituting one of said upper mold portions, further comprising first frame means connected to said lower mold portions for holding said lower mold portions spaced from each other in a first geometrical array and second frame means connected to said upper mold portions for holding said upper mold portions spaced from each other in a second geometrical array, said second geometrical array being a mirror-image of said first geometrical array, whereby each of said lower mold portions forms a respective substantially ovoid mold cavity with a respective one of said second mold portions upon a juxtaposition of said frame means to one another, at least one of the upper mold and the lower mold portion forming each mold cavity being provided with a plurality of corrugations for shaping said egg.

7. A mold for making an egg having a corrugated form, said mold comprising:
a first mold half;
a second mold half engageable with said first mold half to form a substantially ovoid mold cavity sufficiently large to contain a shelled cooked egg of a preselected size in a substantially tight fit, said first and said second mold half having a longitudinal axis of symmetry in an assembled state of the mold; and
shaping means including a plurality of substantially oval corrugations within said first and said second mold half for molding said egg into a corrugated form upon a disposition of said egg in said mold cavity, said corrugations being disposed in respective longitudinal planes each containing said axis, said planes being angularly staggered with respect to one another.

8. The mold defined in claim 7, further comprising clamping means engageable with said first and said second mold half for holding same in engagement with one another upon disposition of said egg in said mold cavity.

9. The mold defined in claim 7 wherein one of said first and said second mold half constitutes a lower mold half and the other of said first and said second mold half constitutes an upper mold half, said upper mold half being of a sufficient weight to exert a compressive molding force on said egg upon disposition thereof in said mold cavity.

10. The mold defined in claim 7 wherein said shaping means includes a plurality of separate elements engageable with one another to form a continuous, generally ovoid surface defining said mold cavity.

11. The mold defined in claim 7 wherein said shaping means includes a plurality of ring shaped elements having different diameters and stackable upon one another to form said corrugations.

12. The mold defined in claim 7, comprising a plurality of lower mold portions and a like plurality of upper mold portions, said first mold half constituting one of said lower mold portions and said second mold half constituting one of said upper mold portions, further comprising first frame means connected to said lower mold portions for holding said lower mold portions spaced from each other in a first geometrical array and second frame means connected to said upper mold portions for holding said upper mold portions spaced from each other in a second geometrical array, said second geometrical array being a mirror-image of said first geometrical array, whereby each of said lower mold portions forms a respective substantially ovoid mold cavity with a respective one of said second mold portions upon a juxtaposition of said frame means to one another, at least one of the upper mold and the lower mold portion forming each mold cavity being provided with a plurality of corrugations for shaping said egg.

* * * * *